United States Patent
Moroto et al.

[11] Patent Number: 5,931,886
[45] Date of Patent: Aug. 3, 1999

[54] CONTROL SYSTEM FOR VEHICULAR AUTOMATIC TRANSMISSION

[75] Inventors: Shuzo Moroto, Nagoya; Nobuaki Miki, Kariya; Muneo Kusafuka, Anjo; Yoshitaka Murase, Okazaki, all of Japan

[73] Assignee: Aisin AW Co., Ltd., Japan

[21] Appl. No.: 08/675,891

[22] Filed: Jul. 5, 1996

[30] Foreign Application Priority Data

Jul. 6, 1995 [JP] Japan .................................. 7-170831

[51] Int. Cl.⁶ ........................................... F16H 59/66
[52] U.S. Cl. .............................. 701/54; 701/55; 701/56; 701/201
[58] Field of Search ................................... 701/51, 55, 56, 701/57, 58, 59, 60, 65, 68, 123, 208, 210, 201, 54; 477/97, 107

[56] References Cited

U.S. PATENT DOCUMENTS

| | | | |
|---|---|---|---|
| 4,630,508 | 12/1986 | Klatt | 74/866 |
| 4,692,866 | 9/1987 | Kosuge | 701/56 |
| 5,748,472 | 5/1998 | Gruhle et al. | 701/55 |
| 5,794,169 | 8/1998 | Jung et al. | 701/57 |

FOREIGN PATENT DOCUMENTS

| | | | |
|---|---|---|---|
| 0532365 | 3/1993 | European Pat. Off. | |
| 43337163 | 5/1994 | Germany | 701/56 |
| 2061424 | 10/1980 | United Kingdom . | |

Primary Examiner—William A. Cuchlinski, Jr.
Attorney, Agent, or Firm—Lorusso & Loud

[57] ABSTRACT

A control system for a vehicular automatic transmission which detects running status of the vehicle and includes a shift controller for controlling the gear stage of the automatic transmission in accordance with the detected running status of the vehicle. The control system further includes a memory for prestoring road information for roads to be run by the vehicle, present location detection and running direction detection. A reader reads out the road information for a set route from the present location to a destination, from the memory, on the basis of the detected present location and the destination input. The engine power required for the vehicle to travel the set route is estimated in accordance with the read road information. A shift schedule which minimizes the fuel consumption on the set route is determined by comparing the estimated engine power requirement with a prestored mileage map and the shift control pattern is changed in accordance with the determined shift schedule.

9 Claims, 7 Drawing Sheets

| | Information | | | Estimation Items | |
|---|---|---|---|---|---|
| | Speed Limit | Distance | Angle of Inclination | Vehicle Speed | Gear |
| A | 60 km/h | 2 km | 0° | 60 km/h | 4 |
| B | 60 km/h | 0.1 km | 10° | 60 km/h | 3 |
| C | 60 km/h | 0.4 km | -2.5° | 60 km/h | 4 |
| D | 60 km/h | 2 km | 0° | 60 km/h | 4 |

FIG. 5

| | Information | | | Estimation Items | |
|---|---|---|---|---|---|
| | Speed Limit | Distance | Angle of Inclination | Vehicle Speed | Gear |
| A | 60 km/h | 2 km | 0° | 60 km/h | 4 |
| B | 60 km/h | 0.1 km | 10° | 60 km/h | 4 |
| C | 60 km/h | 0.4 km | -2.5° | 60 km/h | 4 |
| D | 60 km/h | 2 km | 0° | 60 km/h | 4 |

CONTROL SYSTEM FOR VEHICULAR AUTOMATIC TRANSMISSION

BACKGROUND OF THE INVENTION

1. Field of the Invention

The present invention relates to a control system for a vehicular automatic transmission.

2. Related Art

Vehicular automatic transmissions are conventionally equipped with a shift map which is set beforehand with shift characteristics, so that a shift control may be effected by matching the running status of the vehicle with the shift map. The terminology "vehicular running status," as used herein has reference to a vehicle operating parameter or parameters such as vehicle speed or throttle opening.

Since, however, the control pattern in the shift control is set with reference to an ordinary run, an optimum gear stage is not always set when the vehicle encounters extraordinary road circumstances such as an incline which requires a driving force different from that required for level roads.

Japanese Patent Published No. 58141/1994 discloses a shift control system which monitors the actual detected road circumstances to improve the running safety and the driving comfort by utilizing a navigation system with the shift control so that the control pattern is changed on the basis of the road information obtained from the navigation system in addition to information regarding the running status of the vehicle.

Demands in recent years for lower power consumption to abate environmental pollution also dictate improvement in the aforementioned prior art shift control system which is based upon the running status of the vehicle, set with reference to "normal" running. Such prior art systems cannot provide optimum mileage because the fuel consumption rate changes with change in the required driving force, deriving from changes in the road circumstances.

Japanese application Laid-Open ("Kokai") No. 95721/1981 discloses a shift control system which improves the mileage by calculating the instantaneous driving force required of the vehicle so that a gear stage optimizing the mileage may be set by comparing the driving force with a mileage map.

While the system disclosed by Japanese Patent publication No. 58141/1994 effects shift control by matching the road circumstances, it does not satisfy the demand for increased fuel economy because the shift control does not take mileage into consideration.

On the other hand, Kokai No. 95721/1981 can effect shift control in such a way as to improve the mileage but cannot always provide satisfactory running safety or driving comfort because the shift control does not take into consideration the road circumstances actually encountered by the vehicle.

SUMMARY OF THE INVENTION

Therefore, an object of the present invention is to provide a control system for a vehicular automatic transmission which provides satisfactory running safety and driving comfort and optimum mileage, by applying a navigation system to the shift control of the automatic transmission to set a shift schedule from the present location to the location of a destination, taking into consideration the road circumstances and the mileage.

In order to achieve the above-specified object, the present invention provides a control system for a vehicular automatic transmission, comprising: running status detecting means for detecting the running status of the vehicle; and shift control means for controlling the gear stage of the automatic transmission in accordance with the detected running status of the vehicle. The vehicular automatic transmission control system further comprises: memory means for storing beforehand the information for a road to be run by the vehicle; detection means for detecting the present location and running direction of the vehicle; read means for reading out, from the memory means, road information for a determined route from the present location to a destination, on the basis of the signal from the detection means and the location input as a destination; estimation means for estimating driving force required of the vehicle to run the determined route in accordance with the road information read out; shift setting means for setting a shift schedule to minimize the fuel consumption rate on the determined route by comparing the estimated required driving force and a mileage map stored beforehand; and change means for changing a control pattern for the shift control means in accordance with the set shift schedule.

The control system of the present invention may further include: operation status detecting means for detecting the operation status of each of various accessories which, in operation, increase the engine load; and operation setting means for setting operation schedules for the accessories during travel on the determined route. The estimation means estimates the driving force required for the vehicle to run the determined route in accordance with the road information coming from the read means and the operation schedules of the accessories. The shift setting means sets the shift schedule to minimize fuel consumption in travel on the determined route by comparing the estimated driving force with a mileage map stored beforehand. The change means changes the shift control pattern in accordance with the shift schedule set by the shift setting means.

The operation setting means may reset the operation schedules of the accessories in accordance with changes in operation status and the road information, when changes in operation of the accessories from their initial statuses are detected by the operation status detecting means while the vehicle is running on the determined route. A series of control operations by the estimation means, the shift setting means and the change means are repeated according to the reset operation schedule.

The control system of the present invention may further include engine control means for increasing the fuel injection rate at the time of a shift in the automatic transmission; and calculation means for simulating the fuel consumption rates in a plurality of patterns on the basis of the increase in the fuel feed rate by the engine control means, the road information retrieved by the read means, the driving force estimated by the estimation means and the shift schedule set by the shift setting means. The shift setting means resets the shift schedule to minimize the fuel consumption rate on the basis of the calculation results of the calculation means. The change means changes the control pattern of the shift control means in accordance with the new shift schedule as reset by the shift setting means.

The calculation means calculates the fuel consumption rate on the basis of a first shift schedule, which is set by the shift setting means. If it is decided on the basis of the road information retrieved by the read means that the distance covered by the vehicle at the time of a shift from a first gear stage through a second gear stage to the first gear stage in the first shift schedule is shorter than a predetermined travel distance, a fuel consumption rate is calculated on the basis of a second shift schedule in which there is no shift to the second gear stage. The shift setting means sets the second shift schedule, when the calculation of the calculation means shows that the fuel consumption rate based upon the first shift schedule is higher than that based upon the second shift schedule. The change means changes the control pattern of the shift control means in accordance with the second shift schedule as set by the shift setting means.

The control system of the present invention further includes decision means for deciding whether or not the signal coming from the vehicle running status detecting means is within a predetermined range for the vehicle running status, as estimated by the estimation means on the basis of the road information retrieved by the read means. The change means does not change the shift pattern if the decision means decides that the signal is not within the predetermined range.

DESCRIPTION OF THE PREFERRED EMBODIMENT

An embodiment of the present invention will be described in the following with reference to the accompanying drawings.

Figure 1:
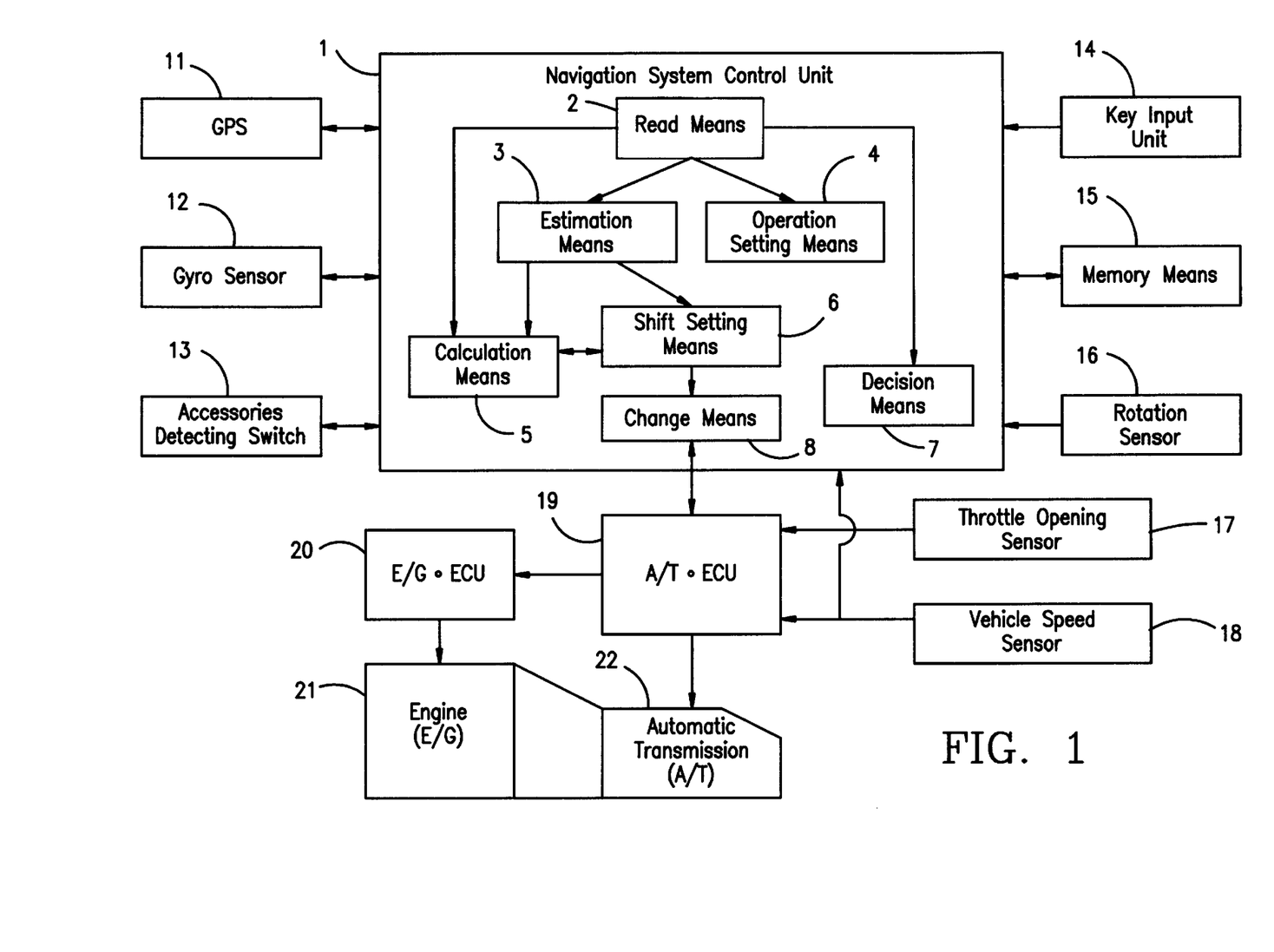
FIG. 1 is a block diagram of a control system for a vehicular automatic transmission according to an embodiment of the present invention.

As shown in FIG. 1, a navigation system control unit 1 includes read means 2, estimation means 3, operation setting means 4, calculation means 5, shift setting means 6, decision means 7 and change means 8. To this navigation system control unit 1, are individually connected a GPS (Global Positioning System) 11, a gyro sensor 12, an accessories detecting switch 13, a key input unit 14, memory means 15, a rotation sensor 16 and a vehicle speed sensor 18.

The change means 8 of the navigation system control unit 1 is connected to an automatic transmission electronic control unit (A/T ECU) 19 for controlling automatic transmission (A/T) 22. Moreover, the A/T ECU 19 is connected with a throttle opening sensor 17, a vehicle speed sensor 18 and an engine electronic control unit (E/G ECU) 20 for controlling engine (E/G) 21.

Upon starting the vehicle, the navigation system control unit 1, the A/T ECU 19 and the E/G ECU 20 are first initialized to operable status.

Next, data is input from the various sensors of the navigation system control unit 1, the A/T ECU 19 and the E/G ECU 20.

The A/T ECU 19 is provided in advance with shift maps which set shift characteristics. These shift maps are compared with the vehicle running status which is detected as the vehicle speed by the vehicle speed sensor 18 and the throttle opening and as the throttle opening by sensor 17, so that a shift control pattern matching the running status of the vehicle can be adopted for deciding the gear stage.

The A/T ECU 19 is connected with the navigation system control unit 1, which retrieves prestored information from the memory means 15 pertaining to the road to be travelled by the vehicle. On the basis of information from the GPS 11 and the gyro sensor 12, the present location and the running direction of the vehicle a re determined. On t he ba sis of these inputs and the input of the destination, road information route determined for travel of the vehicle from the present location to the destination is read out from the memory means 15 by the read means 2 so that the driving force required of the vehicle along the travelled (determined) route is estimated by the estimation means 3 in accordance with the read road information.

The estimated driving force and a mileage map stored in memory means 15 are compared and a shift schedule is thereby set by the shift setting means 6 to minimize the fuel consumption rate along the travelled route. The mileage map is preferably continuously learned and updated by detection of the throttle opening, the engine RPM and the fuel injecting timing during travel along the determined route. In accordance with the shift schedule thus set, moreover, the control pattern in the A/T ECU (or shift control means) 19 is changed by the change means 8.

The navigation system control unit 1 also receives input from the accessories detecting switch ("monitoring means") 13 which monitors the operating status of those accessories which increase the engine load in operation. The operation setting means 4 sets operation schedules for the accessories during travel along the determined route in accordance with the detected operation status of the accessories and the road information retrieved by the read means 2. The estimation means 3 estimates the driving force required for the vehicle in accordance with the road information received from the read means 2 and the operation schedules of the accessories. The shift setting means 6 sets the shift schedule minimizing the fuel consumption rate for the determined route by comparing the estimated driving force and the mileage map stored beforehand. The change means 8 changes the control pattern in the A/T ECU 19 in accordance with the shift schedule which is set by the shift setting means 6.

When changes in accessory operation are detected by the accessories monitoring means, the operation schedules of the accessories are reset by the operation setting means 4 in accordance with the changed operation status and the road information. A series of control operations by the estimation means 3, the shift setting means 6 and the change means 8 are repeated again in accordance with the new operation schedule, as reset by the operation setting means 4.

The engine control means increases the fuel injection rate at the time of a shift of the automatic transmission. The calculation means 5 calculates a simulated fuel consumption rate for each of a plurality of patterns on the basis of the increased fuel injection rate instructed by the engine control means, the road information coming from the read means 2, the driving force estimated by the estimation means 3 and the shift schedule set by the shift setting means 6. The shift setting means resets the shift schedule to minimize the fuel consumption rate, on the basis of the results of calculation by the calculation means 5. The change means 8 changes the control pattern of the A/T ECU 19 in accordance with the new shift schedule, as reset by the shift setting means 6.

The calculation means 5 calculates a first fuel consumption rate on the basis of a first shift schedule, which is set by the shift setting means 6, and, if it is decided on the basis of the road information coming from the read means 2 that the distance covered by the vehicle at the time of a shift from a first gear stage through a second gear stage to the first gear stage in the first shift schedule is shorter than a predetermined travel distance, the calculation means 5 calculates a second fuel consumption rate on the basis of a second shift schedule in which there is no shift to the second gear stage. The shift setting means 6 sets the second shift schedule, when the calculations of the calculation means 5 show that the fuel consumption rate based upon the first shift schedule is higher than that based upon the second shift schedule. The change means 8 changes the control pattern of the A/T ECU 19 in accordance with the second shift schedule which is adopted by the shift setting means 6.

The decision means 7 decides whether or not the signal coming from the vehicle running status detecting means is within a predetermined range for the vehicle running status, as estimated by the estimation means 3 on the basis of the road information coming from the read means 2. The change means 8 does not change the shift pattern if the decision means 7 decides that the signal is not within the predetermined range.

Control of the vehicular automatic transmission of the present invention will now be described with reference to the flow chart of FIG. 2.

(1) Firstly, the key input unit 14 is operated to set a destination (at Step S1).

(2) The road information is acquired (at Step S2) from the memory means 15 by the navigation system control unit 1.

(3) The information from the accessories detecting switch 13 is input. Specifically, the statuses of the air conditioner switch, fan switch and defogger switch are sampled (at Step S3).

(4) Operation schedules for the air conditioner, the fan and the defogger are set (at Step S4).

(5) The scheduled loads of the air conditioner, the fan, the defogger and other accessories are converted into driving horsepower, and the gear shifts are scheduled on the optimum mileage map (at Step S5).

(6) The shift schedule is changed (at Step S6) on the basis of mileage simulation (as will be described in more detail).

(7) It is checked (at Step S7) whether or not the switches of the air conditioner, the fan and the defogger are identical to the initial statuses.

(8) If the answer of Step S7 is NO, their schedule of operation is reset as in S4 (at Step S8).

(9) If the answer of Step S7 is YES, it is checked (at Step S9) whether or not the speed is within ±10% of the speed, as predicted by the scheduling.

(10) If the answer of Step S9 is YES, a learning map is used (at Step S10).

(11) If the answer of Step S9 is NO, an ordinary map is used (at Step S11).

(12) The operations of Step S7 to Step S11 are repeated (at Step S12) until the destination is reached.

Figure 3:
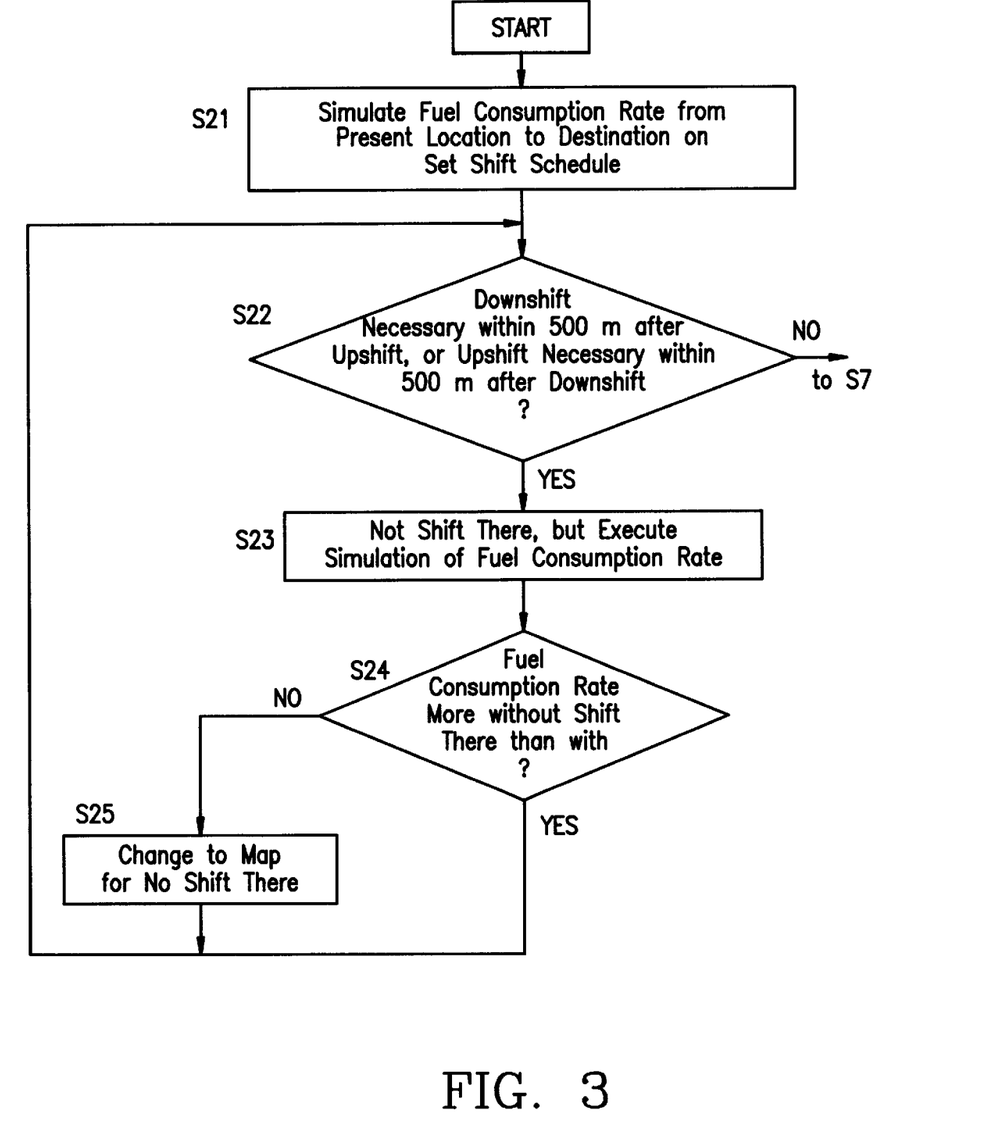
FIG. 3 is a flow chart of a routine for simulating fuel consumption and comparing fuel consumption rates for different shift patterns.

The mileage calculations (fuel consumption simulation) and the rescheduling based thereon may be in accordance with the sub-routine shown in FIG. 3, wherein:

(1) The fuel consumption rate from the present location to the destination is simulated (at Step S21) on the basis of a set shift schedule.

Figure 4:
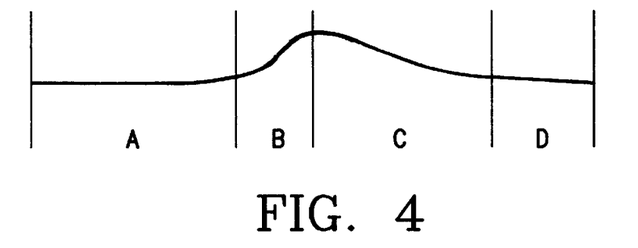
FIG. 4 is a diagram of an example of a determined travel route for the vehicle according to an embodiment of the present invention.
Figure 5:
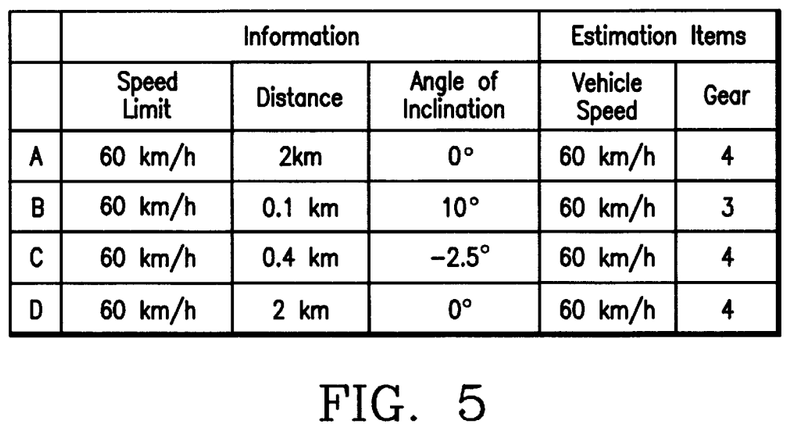
FIG. 5 is an example of a shift control map for the travel route of the vehicle, as shown in FIG. 4.

In the case of the route shown in FIG. 4, for example, there is obtained a shift control map, as shown in FIG. 5. Specifically, it is estimated: that at point A, the vehicle speed is at 60 Km/h in the 4th speed gear stage with a speed limit of 60 Km/h, for a distance of 2 Km and with an angle of inclination of 0 degrees; that at point B, the vehicle speed is 60 Km/h in 3rd speed gear stage with a speed limit of 60 Km/h, for a distance of 0.1 Km and with an angle of inclination of 10 degrees (uphill); that at point C, the vehicle speed is 60 Km/h in the 4th speed gear stage with a speed limit of 60 Km/h, for a distance of 0.4 Km and with an angle of inclination of −2.5 degrees (downhill); and that at point D, the vehicle speed is 60 Km/h in the 4th speed gear stage with a speed limit of 60 Km/h, for a distance of 2 Km and with an angle of inclination of 0 degrees.

(2) Next, it is checked (at Step S22) whether or not a downshift is necessary within 500 m after an upshift and whether or not an upshift is necessary within 500 m after a downshift.

(3) If the answer of Step S22 is YES, no shift is executed at that time, but the fuel consumption rate is simulated (at Step S23). If the answer of Step S22 is NO, the routine proceeds to Step S7 (as shown in FIG. 2).

Figure 6:
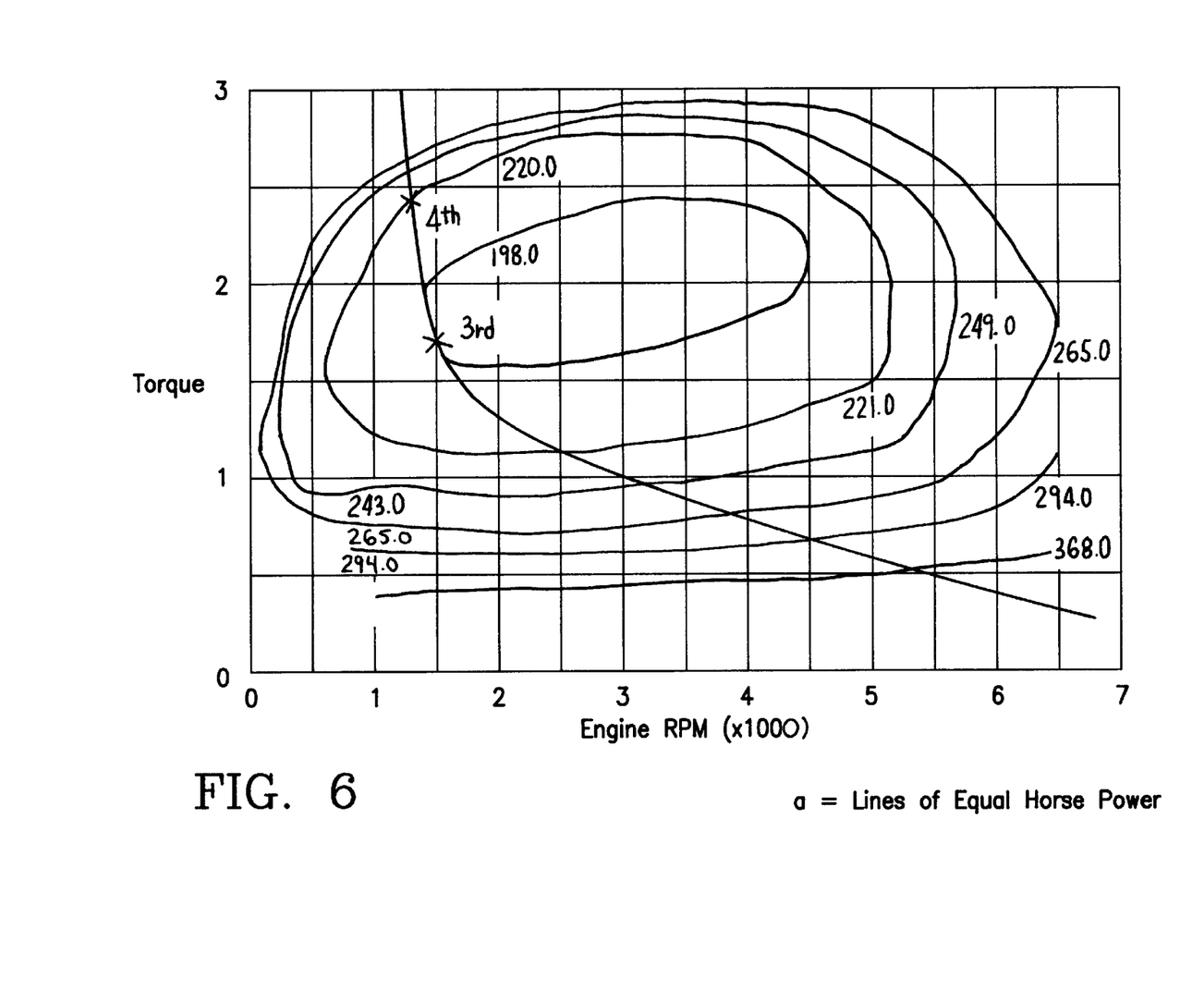
FIG. 6 is a graph of torque (abscissa) versus engine R.P.M. (ordinate) showing an example of a fuel map superimposed thereon according to an embodiment of the present invention.

(4) At Step S24, on the basis of the fuel map (as will be detailed), as shown in FIG. 6, the subroutine determines whether or not the fuel consumption rate is more without than with the shift there.

Figure 7:
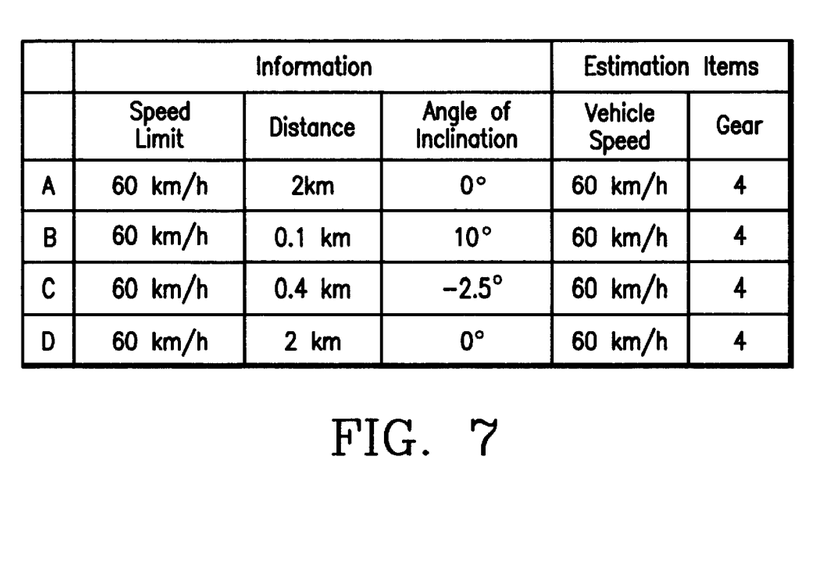
FIG. 7 is an example of a control map which takes mileage into consideration according to an embodiment of the present invention.

(5) If the answer of Step S24 is YES, the map is changed to that for no shift at that point (at Step S25). For example, the shift control map, as shown in FIG. 5, is changed to that shown in FIG. 7. At point B, no shift gives a lower fuel consumption rate so that, not the 3rd gear, but the 4th gear is set. If the answer of Step S24 is YES, the subroutine returns to Step S22.

Figure 2:
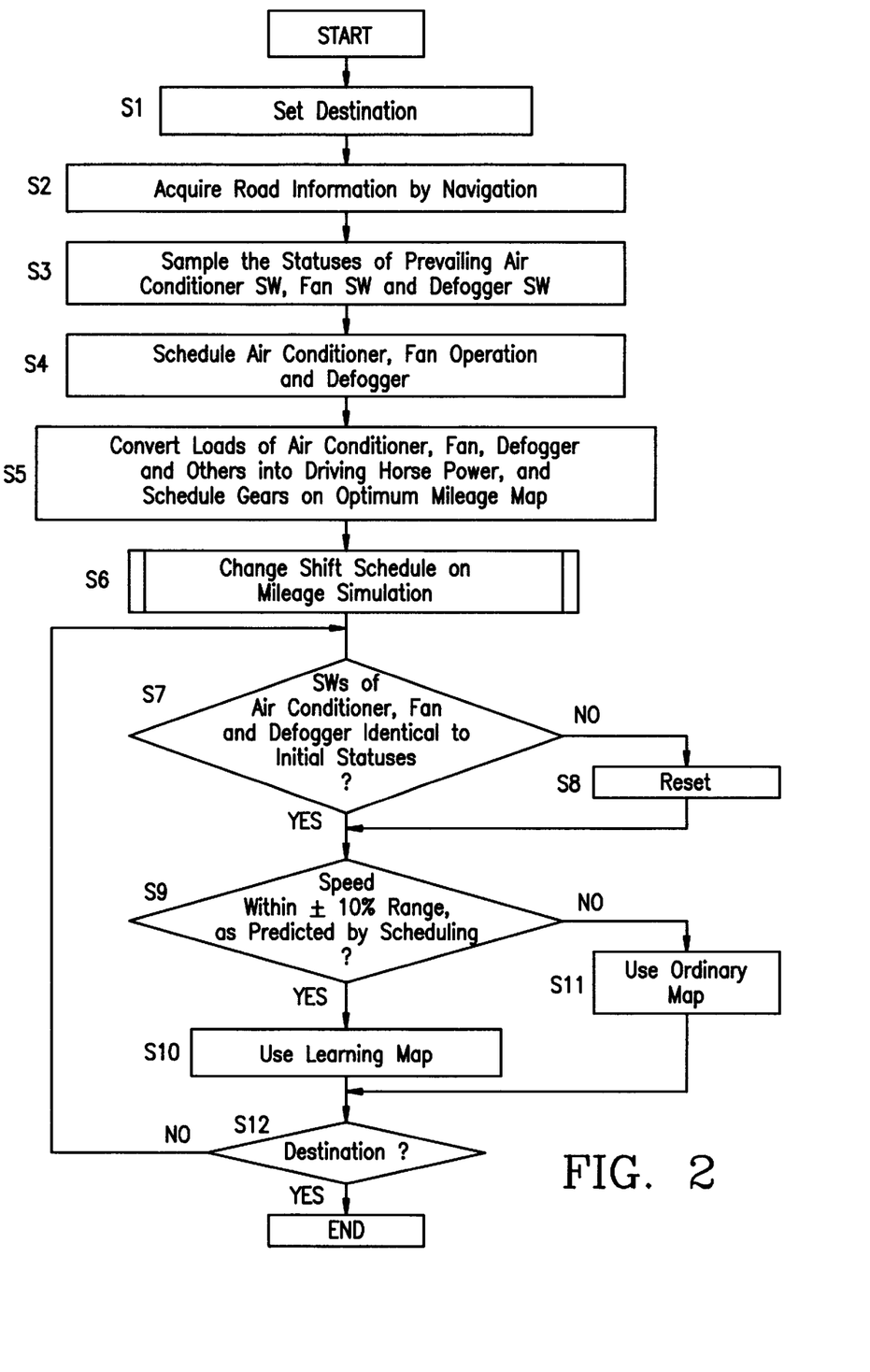
FIG. 2 is a flow chart of a routine for operating the vehicular automatic transmission according to an embodiment of the present invention.
Figure 8:
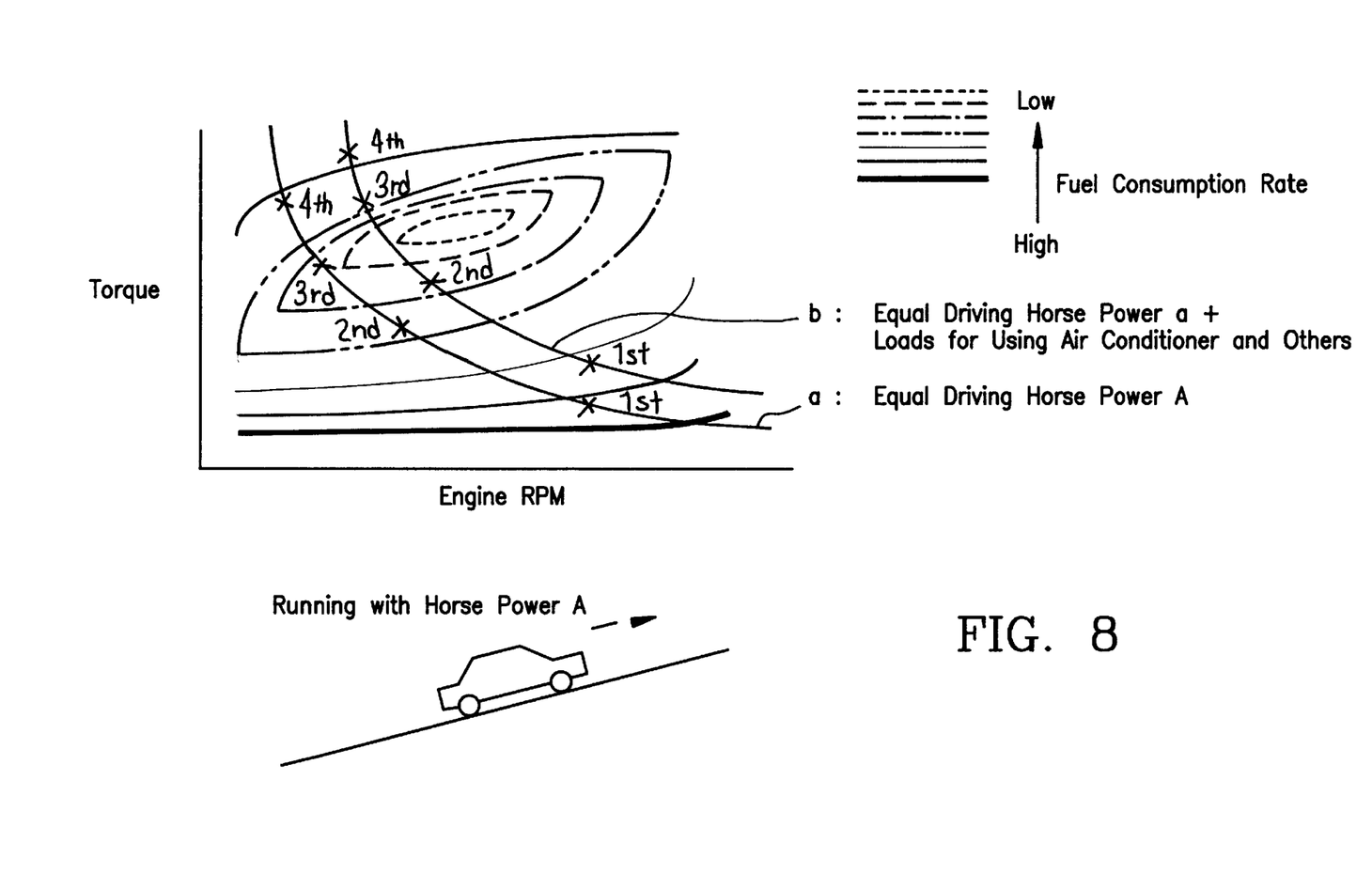
FIG. 8 is a graph of torque (abscissa) versus engine R.P.M. (ordinate) showing an example of a fuel consumption map superimposed thereon.
Figure 9:
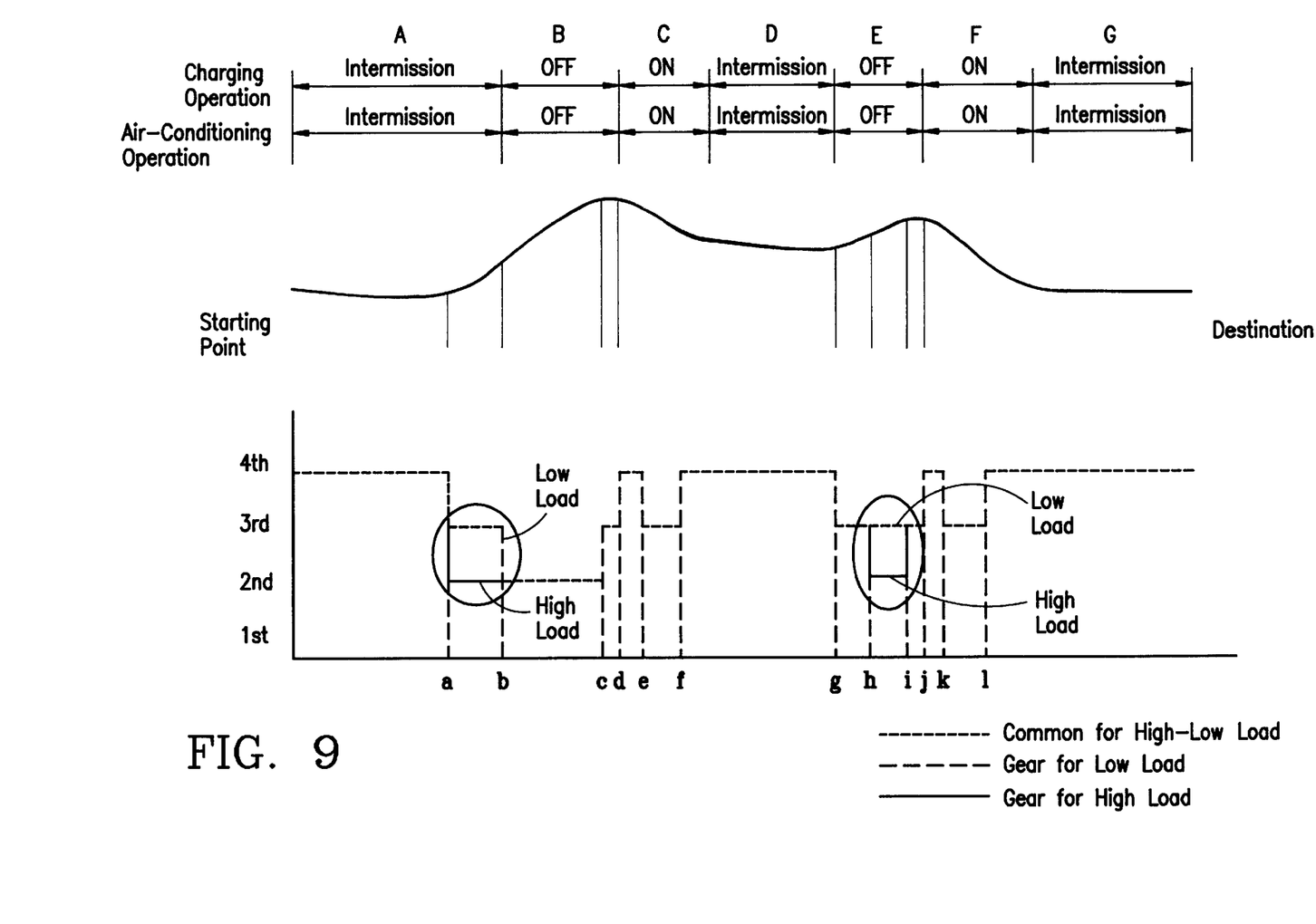
FIG. 9 is a chart illustrating an example of coordination between accessory operation and a shift pattern according to an embodiment of the present invention.

FIG. 9 shows a mileage map, to which are added the navigation information (e.g., the friction coefficient and inclination of the road per step S5 in FIG. 2.). The shift schedule of FIG. 9 is based upon the relationship between engine RPM and the driving torque of FIG. 8, and the vehicle information (e.g., the load attributable to operation of the air conditioner and the number of occupants) at Step S5. Specifically, in FIG. 8 curve "a" indicates a constant driving horsepower A (under a light load), and curve b indicates the case (under a heavy load) in which the load of operation of the air conditioner or the like is added to the constant driving horsepower A. In FIG. 9, the optimum gear under light ("low") load is seen to be the 3rd, that is, the optimum gear for producing the constant driving horsepower A is the 3rd gear. The optimum gear for heavy load is the 2nd, i.e. the optimum gear for the sum of a constant driving horsepower and the load imposed by operation of the air conditioner.

FIG. 9 also illustrates use of the navigation system. The "timing for the shift" and "what gear is to be selected" are determined on the basis of the road information (e.g., the inclination information) from the starting point to the destination so as to minimize the fuel consumption rate as indicated by the fuel map, and the shifting is effected according to the determined shift timing and selected gear.

When the simulation of fuel consumption rate results in a decision that no shift can improve the mileage, the command of "no shift" is sent from the navigation system to the A/T ECU 19 and no shift is executed.

Thus, a gear stage of highly efficient fuel consumption can be automatically set by the A/T ECU 19 on the basis of the navigation information and the vehicle information.

The fuel consumption rate in the control of the vehicular automatic transmission of the present invention is calculated in the following manner.

(1) The constant running load horsepower F (reference HP) is calculated by:

$$F = kX \times SP/75 \text{ (ps)},$$

wherein
k: Constant, X: Vehicle Weight (Kg),
SP: Vehicle Speed (m/s), and
75: Constant (1 ps=75 Kgf m/s).

Incidentally, the vehicle speed SP is estimated from the speed limit information included in the road information.

(2) The constant running load horsepower F (changed in accordance with the road information and the vehicle speed) is calculated by:

$$F\ k(X+x) \times SP/75 + f \text{ (ps)},$$

wherein
x: Variable (Kg), and
f: Variable (ps).

Incidentally, the variable x is a conversion factor for converting the number of occupants or the road inclination into a weight. Moreover, the variable f is a load horsepower, as changed in accordance with the operation statuses of the accessories. These data are prestored in memory.

(3) The engine torque Te is calculated as:

$$Te = F \times r/\text{Gear Ratio} \times D \text{ (Kgf m)},$$

wherein
r: Effective Diameter of the Driving Wheels,
D: Differential Ratio, and
Gear Ratio, as exemplified by:
1st: 2.50
2nd: 1.50
3rd: 1.00
4th: 0.75.

(4) The constant fuel consumption rate F1 and the engine RPM Ne are calculated in the following manner:

The constant fuel consumption rate F1 (g/ps h) for the constant running load horsepower F and the engine torque Te and the engine RPM Ne (rpm) are determined from the mileage map.

The shift schedule for the vehicular travel route is set by selecting the gear stage for the minimum fuel consumption rate.

(5) The fuel consumption rate FL is calculated:

$$FL = F1 \times Ne \times T \text{ (g rpm/ps)},$$

wherein
T: hour (h).

The fuel consumption rates for the 3rd speed and the 4th speed are determined from the mileage map shown in FIG. 6, for example. For the running of the vehicle at a predetermined constant horsepower, the fuel consumption rate at point B in the route of FIG. 4 is determined at the speed of 60 Km/h and for the distance of 0.1 Km in the following manner:

for Ne=1,500 and F1=198 at the 3rd speed, $$1,500 \times 198 \times (0.1 \times 60)/60 = 29,700;$$

and for N3=1,350 and F1=220 at the 4th speed, $$1,350 \times 220 \times (0.1 \times 60)/60 = 29700.$$

If the increase (1.5 times normal) in the delay angle during the shift from the 3rd to 4th speeds and from the 4th to 3rd speeds is considered, the fuel consumption rate with shifts from the 4th to 3rd speed and from the 3rd to 4th speed, is as follows:

$$29,700 + [(198+220) \times (1/2)] = 29,909.$$

Hence, it is found that no shift gives better, lower fuel consumption.

Here, it is further assumed that the route as shown in FIG. 9 has been selected.

In travel through A, D and G, the vehicle runs in the ordinary manner in 4th speed. The air conditioner and battery charging are OFF at points B and E but ON at points C and F. Thus, useless energy generation at points C and F is avoided to improve the fuel efficiency.

On the basis of the road information, moreover, the optimum gear speeds are set. In other words, shifting can be finely controlled ("fine-tuned") on the basis of the navigation information and the vehicle information, both of which affect the mileage.

Energy is regenerated by setting the gear under the heavy load from the 4th to 2nd speeds and the gear under the light load from the 4th to 3rd speeds at a point from a to b, by setting the gear under the heavy load from the 3rd to 2nd speeds at a point from h to i, and by braking the engine at a point from e to f and at a point from k to 1. For example, the battery is scheduled to be charged, not on an uphill slope, but only on a downhill slope.

The description thus far made is summarized in the following manner.

(1) During the run, the characteristics of the throttle opening, the engine RPM and the fuel injection timing of the vehicle are determined in order to update the learning of the mileage map on the basis of these parameters.

(2) The variation from the ideal status (e.g., the air conditioner OFF or the number of occupants) of the vehicle is converted into a driving load.

(3) By using the navigation system, information for the friction coefficient, vehicle movement and inclination of the road are converted into values for driving load.

(4) On the basis of the foregoing items of information (1) to (3) and information pertaining to the route from the starting point to the destination obtained by the navigation system, the gear simulation for optimizing the fuel consumption rate is executed.

(5) The simulated gear is used, if the vehicle speed estimated during the run is within an error of ±10%, but otherwise the ordinary shift is executed.

(6) Moreover, the intervals for air conditioning operation or the battery charging operation, as determined at the time of selecting the route, are scheduled.

In accordance with the present invention, the driving force required for travel on a set route, from the present location to the destination, is estimated according to the road information coming from the read means. Specifically, the driving force required for coping with changing circumstances on the road to be encountered by the vehicle, such as hills and flat runs, is estimated on the basis of road information for the set route, as obtained from the navigation system, so that the required driving energy can be matched beforehand with the anticipated road and traffic conditions.

The estimated driving force and the mileage map stored in memory are compared by the shift setting means to set the shift schedule in advance in such a way to minimize the fuel consumption rate for the set route and to satisfactorily match the road conditions. According to the set shift schedule, moreover, the control pattern of the shift control, designed for ordinary vehicular running, may be changed by the change means. When the predetermined running status is estimated beforehand by the estimation means, the gear stages of the preset shift schedule are used instead of those gear stages that would be established in ordinary shift control. As a result, the shift control for the set route, for travel from the present location to the destination, will take into consideration the road circumstances and the fuel mileage, to satisfy requirements for safety and driving comfort, while optimizing the fuel mileage.

Because use of accessories such as an air conditioner or a defogger is thought to influence the driving power and the fuel mileage during running by setting operation schedules for the accessories according to the road information, the increase in the engine load due to the operation of the accessories is reduced by turning OFF the air conditioner, e.g. for travel uphill, to increase the power available to drive the vehicle. As a result, the total power consumed in travel of the preset route is reduced in interest of fuel economy.

Because operation of the accessories may be changed during running of the vehicle by the driver or by a timer, and the power required by the vehicle may accordingly change, if the operation of the accessories or the shifting is strictly controlled according to a preset accessory operation schedule or a preset shift schedule, the driver may sense malfunction and fail to effect operation in a manner optimizing fuel mileage. For this reason, when a change in operation of the accessories (different from the initial status) is detected by the operation status detecting means, the operation schedule is reset, and the control operations are repeated. Even if the operation of the accessories is changed during the run by the driver or the timer, the accessories operation schedules and/or the shift schedule can be reset to match the changes so that the driver will not sense a malfunction and will continue the optimum mileage schedule.

In some recently manufactured vehicles torque reduction control (or the angle delaying control) is utilized to reduce the engine torque at the time of a shift to reduce the shift shock. With this engine torque control the fuel injection rate is increased to reduce the combustion temperature of the engine, i.e. cooling the engine with the increased fuel.

Satisfactory driving comfort and fuel economy are made compatible with shift control responsive to changing road circumstances. For the vehicle which is controlled to increase the fuel injection rate at the time of a shift, however, gear changes are frequently made in dependence upon the road circumstances such as mountainous roads. Then, the fuel consumption may be less without any gear change, if the total fuel consumption rate is calculated from the present location to the destination location of the vehicle.

On the basis of the information coming from the engine control means, the read means, the estimation means and the shift setting means, fuel consumption rates for a plurality of shift patterns are simulated to reset the shift schedule to minimize the fuel consumption rate, on the basis of the results of the simulation. When the vehicle is running a route in which a relatively short flat road section exists between hills best traversed in 3rd speed, the speed change to the 4th speed is not effected for that flat road section if the fuel consumption rate is less without any shift than with the shift to the 4th speed on the flat road. As a result, the total fuel consumption rate for the overall travel of the vehicle can be minimized, with satisfactory driving comfort.

Thus, shift control for an optimum mileage run can be realized even in a vehicle in which the fuel injection rate is increased at the time of a shift, without sacrifice of safety or satisfactory driving comfort, as realized by the shift schedule according to the road information for the set route of the vehicle.

According to the present invention, in order to estimate the driving power required for running a preset route, it is necessary to estimate the vehicular running status. The estimation means may estimate the vehicular running status from the limit speed or the like. However, the actual running status of the vehicle is not always identical to that which is estimated from the road information. If the actual vehicular running status does not conform to the estimated, e.g. due to an unintended braking action, the driving power required of the vehicle also changes. Accordingly, if the shift schedule as preset by the shift setting means is adhered to, the driver may sense a malfunction and/or the mileage may deteriorate. Therefore, a decision means is provided for deciding whether or not the actual running status of the vehicle is within a predetermined range of that estimated. If this decision means decides that the actual running status is outside the predetermined range, shift control is effected in the usual manner responsive to road conditions to optimize mileage, without reference to the preset shift schedule. In other words, when there is an inconsistency between the actual and estimated running statuses of the vehicle due to unintended braking action, the shift control is effected in the conventional manner, rather than according to a preset schedule, so that the driver will not sense a malfunction and the mileage can be prevented from deteriorating.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A control system for controlling an automatic transmission in a vehicle, comprising:
   running status detecting means for detecting the running status of a vehicle;
   shift control means for determining the gear stage of the automatic transmission in accordance with a shift control pattern responsive to the detected running status of the vehicle;
   memory means for storing road information pertaining to roads to be run by the vehicle and a mileage map;
   detection means for detecting the present location and running direction of the vehicle;

read means for reading out the road information, for roads to be traversed along a set route from the detected present location to the destination, from said memory means, on the basis of inputs for the detected present location and the destination;

estimation means for estimating the engine power required of the vehicle for travelling the set route, based on the read road information;

shift setting means for determining a set shift schedule to minimize fuel consumption on the set route, by applying the estimated engine power to the mileage map; and change means for changing the shift control pattern of said shift control means to conform to the set shift schedule.

2. A control system according to claim 1, further comprising:

operation status detecting means for detecting the operational status of each of a plurality of accessories increase the engine load when in operation;

operation setting means for setting the operation schedules for said accessories along the set route; and wherein said estimation means estimates the required engine power in accordance with the read road information and the operation schedules for said accessories.

3. A control system according to claim 2, wherein said operation setting means resets the operation schedules for said accessories in accordance with the detected operational status and said road information when a change in the operational status of said accessories is detected by said operation status detecting means while said vehicle is running said set route, and wherein a series of control operations by said estimation means, said shift setting means and said change means are repeated according to the reset operational schedules.

4. A control system according to claim 3, further comprising:

engine control means for increasing the fuel injection rate at the time of a shift of the automatic transmission; and calculation means for simulating the fuel consumption rate for each of a plurality of shift control patterns on the basis of the increase in the fuel injection rate, the read road information, the engine power estimated by said estimation means and the shift schedule set by said shift setting means, wherein said shift setting means resets the shift schedule to minimize the fuel consumption rate on the basis of the results obtained by the calculation means, and wherein said change means changes the shift control pattern of said shift control means in accordance with the shift schedule as reset by said shift setting means.

5. A control system according to claim 4, wherein the calculation means calculates the fuel consumption rate on the basis of a first shift schedule, which is set by said shift setting means, decides on the basis of the road information coming from said read means if the distance covered by the vehicle at the time of a shift from a first gear stage through a second gear stage to the first gear stage in the first shift schedule is shorter than a predetermined covered distance, and, if shorter, calculates a fuel consumption rate on the basis of a second shift schedule in which there is no shift to the second gear stage, wherein said shift setting means sets the second shift schedule as the set shift schedule, when the results obtained by said calculation means show that the fuel consumption rate based upon the first shift schedule is higher than that based upon the second shift schedule, and wherein said change means changes the shift control pattern of said shift control means in accordance with the second shift schedule.

6. A control system according to claim 5, further comprising:

decision means for deciding whether or not the signal coming from said vehicle running status detecting means is within a predetermined range for the vehicle running status, as estimated by said estimation means on the basis of the read road information coming, and wherein said change means does not change the shift control pattern if said decision means decides that said signal is not within the predetermined range.

7. A control system according to claim 1 wherein said running status is detected as vehicle speed.

8. A control system according to claim 1 wherein said running status is detected as throttle opening.

9. A control system according to claim 1 wherein said running status is detected as vehicle speed and throttle opening.

* * * * *